Dec. 31, 1968   T. FOOTE   3,419,043
VALVE APPARATUS
Filed Dec. 15, 1966

INVENTOR
THEODORE FOOTE

BY *James L. O'Brien*

ATTORNEY

United States Patent Office 3,419,043
Patented Dec. 31, 1968

3,419,043
VALVE APPARATUS
Theodore Foote, Madeira, Ohio, assignor to The Bendix Corporation, a corporation of Delaware
Filed Dec. 15, 1966, Ser. No. 602,023
5 Claims. (Cl. 137—625.48)

ABSTRACT OF THE DISCLOSURE

A valve apparatus is disclosed in which the stem sleeves and O-rings are positioned on a reciprocatable rod between a fixed abutment and an abutment which is movable towards the fixed abutment so as to axially compress the O-rings. Spring means on the rod applies a force to the movable abutment urging it toward the fixed abutment, and the spring means includes temperature responsive means which operates to vary the magnitude of the spring force on the O-rings in response to changes in valve temperature.

---

Figure 1:
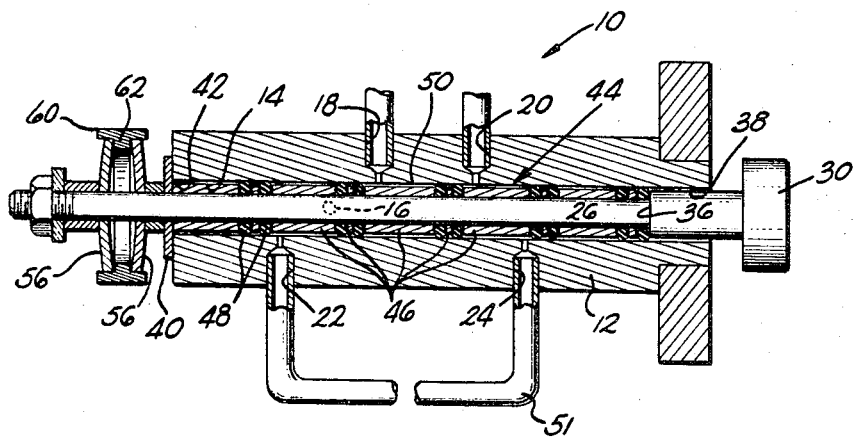

This invention relates generally to valve apparatus and more particularly to a segmented stem valve which includes sealing O-rings that are compressed in accordance with existing temperature conditions at the valve.

The valve apparatus of the type to which this invention relates is particularly useful as a sampling and switching device in analytical work such as chromatography and mass spectrometry in which known volumes of gas samples must be transferred from one stream to another and streams are switched from one flow path to another, although it may be utilized for other purposes also. One valve apparatus of this type includes a passage in which a valve rod is reciprocatable. A segmented stem, consisting of a plurality of coaxial sleeves which are axially spaced, extends about the rod, and O-rings, formed of an elastomeric material such as rubber, or a deformable plastic material, are coaxially arranged with and positioned between the sleeves. As a result, when the sleeves are subjected to axial forces tending to move them toward each other, the O-rings are axially compressed between the sleeves so that the O-rings are radially expanded into sealing engagement with the passage. This type of valve apparatus is normally operated at temperatures above room temperature, and in fact the gases introduced into the valve apparatus can be well above 180° C. Consequently, the compressive force to which the sleeves are subjected for axially compressing the O-rings is usually set at a particular force suitable for the intended operating temperature of the valve. In the event the temperature of operation exceeds that for which the O-ring pressure is optimum, the life of the O-rings is restricted to a few cycles of operation. Conversely, in the event the temperature of operation drops below that for which the O-ring pressure is optimum, a leak between adjoining passages and between passages and atmosphere is likely to occur. Suitable means for automatically adjusting the O-ring pressure in valve apparatus of this type is therefore desirable in order to prolong the life of the valve O-rings. It is an object of this invention, therefore, to provide improved valve apparatus of this type which includes a temperature responsive means for automatically changing the O-ring pressures in response to temperature changes of the valve.

In the improved valve apparatus of this invention, the stem sleeves and the O-rings are positioned on the rod between a fixed abutment and an abutment which is movable toward the fixed abutment so as to axially compress the O-rings. Spring means on the rod applies a force to the movable abutment urging it toward the fixed abutment, and the spring means includes temperature responsive means which operates to vary the magnitude of the spring force on the O-rings in response to changes in valve temperature. The spring means in a preferred embodiment of the invention consists of spring washers, such as Belleville type washers, and temperature compensation is obtained by forming at least some of the washers of the thermostatic bimetal so that the spring force of the washers on the movable abutment will automatically vary with valve temperature changes.

Figure 2:
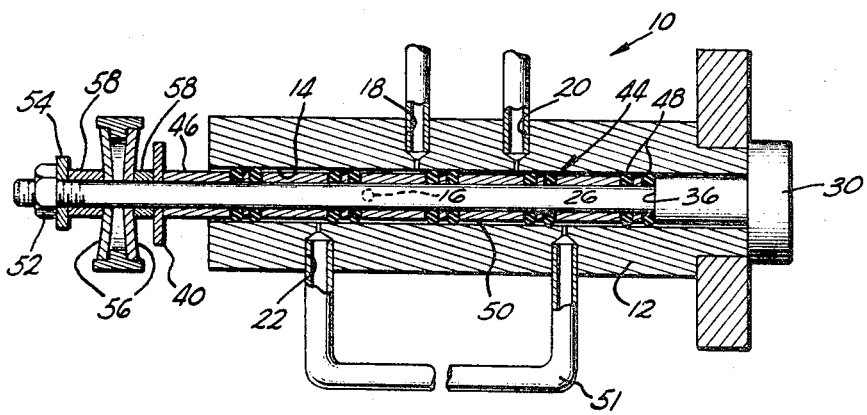

Further objects, features and advantages of this invention will become apparent from a consideration of the following description, the appended claims, and the accompanying drawing in which:

FIGURE 1 is a longitudinal sectional view of the improved valve apparatus of this invention, showing the valve in one position; and FIGURE 2 is a longitudinal sectional view of the improved valve apparatus of this invention, illustrated similarly to FIG. 1, showing the valve in another position and showing the thermostatic spring means in a position which it assumes when heated.

With reference to the drawing, the improved valve apparatus of this invention, indicated generally at 10, is illustrated in FIG. 1 as consisting of a valve housing or body 12 having an open-ended through passage 14 formed therein. The passage 14 communicates with an inlet port 16, exhaust ports 18 and 20 and sample loop ports 22 and 24. An elongated valve rod 26 extends axially through the passage 14 and is shown as being connected at one of its ends to a knob or handle 30. By manipulating knob 30, the valve rod 26 can be moved between the positions shown in FIGS. 1 and 2.

The valve rod 26 is formed intermediate its ends with a shoulder 36, which constitutes a fixed abutment on the rod 26 positioned within the valve passage 14 adjacent the end 38 thereof. A collar 40 is slidably mounted on the rod 26 outside the passage 14 at a position adjacent the opposite end 42 of the passage 14. The collar 40 constitutes a movable abutment on the rod 26 since it is slidable on the rod 26 toward and away from the fixed abutment 36.

A sleeve and O-ring assembly indicated generally at 44, is mounted on the rod 26 at a position between the shoulder 36 and the end collar 40. The assembly 44 consists of a plurality of tubular sleeves 46, of different lengths, positioned in a coaxial relation on the rod 26 so that the sleeves 46 are axially spaced. The assembly 44 also includes a plurality of O-rings 48, formed of an elastomeric material such as rubber or plastic, positioned in an alternating relation with the sleeves 46. The O-rings 48 can be arranged singly or in pairs on the rod 26 as shown in the illustrated embodiment of the invention. The sleeves 46 between the O-rings 48 in each pair are so short they could be termed washers. However, as used herein the term "sleeves" is inclusive of washers. The O-rings 48 have substantially the same inner diameter as the sleeves 46, but a larger outer diameter than the sleeves 46. As a result, when the sleeves 46 are moved axially toward each other, the O-rings 48 therebetween are axially compressed with the result that they are radially expanded into sealing engagement with the passage 14. As a result, tubular passage sections 50 of predetermined volume are formed in the passage 14 with adjacent sections being separated by the O-rings 48. In the position of valve rod 26 shown in FIG. 1, gases entering through port 16 flow through port 22 into an external circuit or loop 51, only a portion of which is shown. The gases then flow into valve body 12 through port 24 and exhaust through port 20. By reciprocating the valve rod 26, and the assembly 44, in the passage 14, to the position shown in FIG. 2, the loop 51 is isolated and port 16 is connected to exhaust port 18.

The assembly 44 is positioned on the valve rod 26 so that the O-ring 48 at one end of the assembly 44 abuts the shoulder 36. The sleeve 46 at the opposite end of the assembly 44 abuts the end collar 40. As a result, when the abutment 40 is moved toward the abutment 36, the desired axial compression and radial expansion of the O-rings 48 is obtained.

In order to provide a force on the end collar 40 tending to move it toward the shoulder 36, a lock nut 52 is mounted on the terminal end of the rod 26 in association with an adjustable plate 54, a pair of sleeves 58, and a plurality of spring washers 56, illustrated as being two in number and of Belleville type, are positioned between the sleeves 58. The position of the plate 54 can be adjusted axially of the rod 26 to vary the magnitude of the spring force exerted by the washers 56 on the end collar 40.

In the preferred form of the improved valve 10 of this invention, spring washers 56 are formed of thermostatic bimetal and are coaxially arranged with their peripheries supported in a ring 60 which has a radially inwardly extending flange 62 which separates the washers 56. As a result, as the valve housing 12 becomes heated or cooled in accordance with the temperature of the gas flowing therethrough or the temperature of the environment, the washers 56 will become similarly heated or cooled, causing the washers 56 to flex in a direction to either increase or decrease the magnitude of the spring force which they apply to the end collar 40, to thereby compensate for the differential in thermal expansion between the elastomeric O-rings 48 and the metal sleeves 46 and metal body 12. The washers 56 are dished or of generally cup shape when cool, as shown in FIG. 1, and have their concave sides facing each other so that they exert an axially compressive spring force of the desired magnitude on the sleeve and O-ring assembly 44. As the washers 56 become heated, they first flatten out, due to their bimetallic construction, and as they become further heated, they bow in the opposite direction, as illustrated in FIG. 2. Thus, in the preferred embodiment of the invention, as the temperature of the washers 56 increases, the washers tend to flatten out, thereby reducing the magnitude of the spring force which they appply to the end collar 40. The result of this discreased force is a decreased axial pressure on the O-rings 48 at the higher temperatures to compensate for differential expansion between the valve body 12, the metal sleeves 46 and the rubber or plastic O-rings 48 and also to compensate for softening of the O-rings 48 at the higher temperatures. The result is an automatic compensation of the O-ring pressures for temperature changes. The valve 10 is actuated by moving the knob 30 in a direction axially of rod 26 to reciprocate the rod 26 between the limit positions illustrated in FIGS. 1 and 2. In the valve 10, when the rod 26 is reciprocated as just described, the O-rings 48 are capable of better withstanding the frictional forces applied thereto during movement through the passage 14 because of the automatic pressure adjustment for temperature conditions accomplished by the temperature responsive means incorporated in the spring means 56.

From the above description, it is seen that this invention provides improved valve apparatus 10 in which the O-ring pressures are automatically adjusted to change temperature conditions. The spring washers 56, which constitute spring means for providing the O-ring pressures, can be arranged in a variety of ways other than in the form illustrated, for example the washers 56 can be stacked, and can incorporate any desired number of washers formed of thermostatic bimetal. In other words, the number of thermostatic bimetal washers 56 to be used is determined to some extent by the degree of temperature compensation desired in the valve 10. The illustrated arrangement is simple, uses only two washers and provides for effective utilization of washer deflection. The sleeves 58 are in constant engagement with the washers 56 to insure transmission of washer deflection to the sleeve and O-ring assembly 44, and one of the sleeves 58 covers the threads on rod 26 to prevent the threads from affecting washer deflection. The O-rings 48 can be formed of rubber, or other common and exotic plastics such as polytetrafluoroethylene, all of which materials are included herein under the generic term "elastomeric."

It will be understood that the valve apparatus which is herein disclosed and described is presented for purposes of explanation and illustration and is not intended to indicate limits of the invention, the scope of which is defined by the following claims.

I claim:
1. In valve apparatus which includes a reciprocable rod having a sleeve and O-ring assembly thereon consisting of a plurality of coaxial sleeves and elastomeric O-rings arranged in an alternating relation, a first fixed abutment on said rod engaging one end of said assembly, a second abutment engaging the other end of said assembly and movable axially of said rod toward said first abutment so as to urge said sleeves axially toward each other and thereby compress said O-rings in an axial direction to cause radial expansion thereof, spring means on said rod applying a force to said movable abutment urging it toward said fixed abutment, said spring means including temperature responsive means operative to vary the magnitude of said force in response to changes in temperature.

2. In valve apparatus having the structure of claim 1 wherein said spring means is a plurality of spring washers and at least one of said washers is formed of thermostatic bimetal.

3. In valve apparatus having the structure of claim 2 and further including a housing provided with a passage in which said rod is positioned and wherein said sleeves are of a smaller outer diameter than the diameter of said passage and said O-rings are of a greater diameter than said sleeves for radial expansion into engagement with said passage.

4. In valve apparatus having the structure of claim 1 wherein said spring means consists of a pair of dished spring washers each of which has a concave side, and a ring member arranged coaxially with said rod, said washers being substantially axially aligned and having the peripheries thereof supported on said ring member.

5. In valve apparatus having the structure of claim 4 wherein said spring washers are formed of thermostatic bimetal so that when cool said washers have their concave sides facing each other and when heated said washers flatten out and then reverse their curvatures.

References Cited
UNITED STATES PATENTS

| | | | |
|---|---|---|---|
| 2,253,904 | 8/1941 | Haug | 277—26 |
| 2,773,710 | 12/1956 | Smith | 285—187 |
| 3,277,797 | 10/1966 | Tyree et al. | 277—26 XR |
| 3,347,269 | 10/1967 | Courneya et al. | 137—625.48 |
| 3,307,586 | 3/1967 | Meyer | 137—625.69 |

HENRY T. KLINKSIEK, *Primary Examiner.*

U.S. Cl. X.R.

277—26, 116.2